Jan. 6, 1970  W. L. BONGIANNI  3,488,607
ULTRASONIC DISPERSIVE DELAY LINE
Filed May 1, 1967  3 Sheets-Sheet 1

INVENTOR.
WAYNE L. BONGIANNI,
Robert H. Himes
ATTORNEY.

Jan. 6, 1970     W. L. BONGIANNI     3,488,607
ULTRASONIC DISPERSIVE DELAY LINE

Filed May 4, 1967     3 Sheets-Sheet 3

United States Patent Office 3,488,607
Patented Jan. 6, 1970

3,488,607
ULTRASONIC DISPERSIVE DELAY LINE
Wayne L. Bongianni, La Habra, Calif., assignor to Hughes Aircraft Company, Culver City, Calif., a corporation of Delaware
Filed May 4, 1967, Ser. No. 636,063
Int. Cl. H03h 7/30
U.S. Cl. 333—30
2 Claims

ABSTRACT OF THE DISCLOSURE

The apparatus of the present invention provides an ultrasonic dispersive delay line that employs a uniformly ruled optical diffraction grating on a media in which ultrasonic waves can be launched from a single transducer. In operation, the uniform optical diffraction grating steers the ultrasonic wave in a direction determined by the frequency thereof so as to produce a path length that is a function of the ultrasonic frequency thereby expanding or compressing the microwave signal in accordance with the acoustic time delay versus frequency characteristics of the device. The grating is scribed with a 60 degree cut blazing angle to provide maximum sensitivity at a 60 degree diffraction angle. Lenseless focussing is achieved by the use of a media having a Rowland circle configuration to increase the frequency range of operation.

BACKGROUND OF THE INVENTION

The device of the present invention constitutes an ultrasonic dispersive delay line. One contemporary device called a perpendicular diffraction delay line provides linear frequency modulation. This delay line consists of two transducer arrays—one for transmitting and the other for receiving—distributed along the perpendicular surfaces of a delay medium. Other contemporary forms of dispersive delay lines are known as surface wave dispersive delay lines and wedge dispersive delay lines. All of these contemporary devices comprise an ultrasonic grating illuminated by a nondispersive acoustic wave.

SUMMARY OF THE INVENTION

In accordance with a first embodiment of the present invention, an ultrasonic wave is launched in a media from a single transducer towards an opposing surface on which is scribed a uniformly ruled optical diffraction grating. This optical diffraction grating reflects the ultrasonic wave back towards a receiving transducer of substantial dimensions along a path length that varies with the frequency of the wave. In an alternate embodiment, the surface of the media on which the uniformly ruled optical diffraction grating is scribed has the configuration of the concave side of a Rowland circle, thereby to cause the reflected ultrasonic wave to impinge on the receiving transducer over a broader range of frequencies.

In that the device of the subject invention does not employ an array of transducers as is the case with contemporary delay lines of this type, it does not have the concomitant limitations introduced by the mechanical tolerances of an array. As a consequence, the delay line of the present invention has a much higher operating frequency and a correspondingly greater actual bandwidth, e.g., the device may be operated at 30 and 90 mc./sec. as compared to a center frequency of 1.7 mc./sec. for the contemporary delay lines.

DESCRIPTION OF THE PREFERRED EMBODIMENTS

Figure 1:
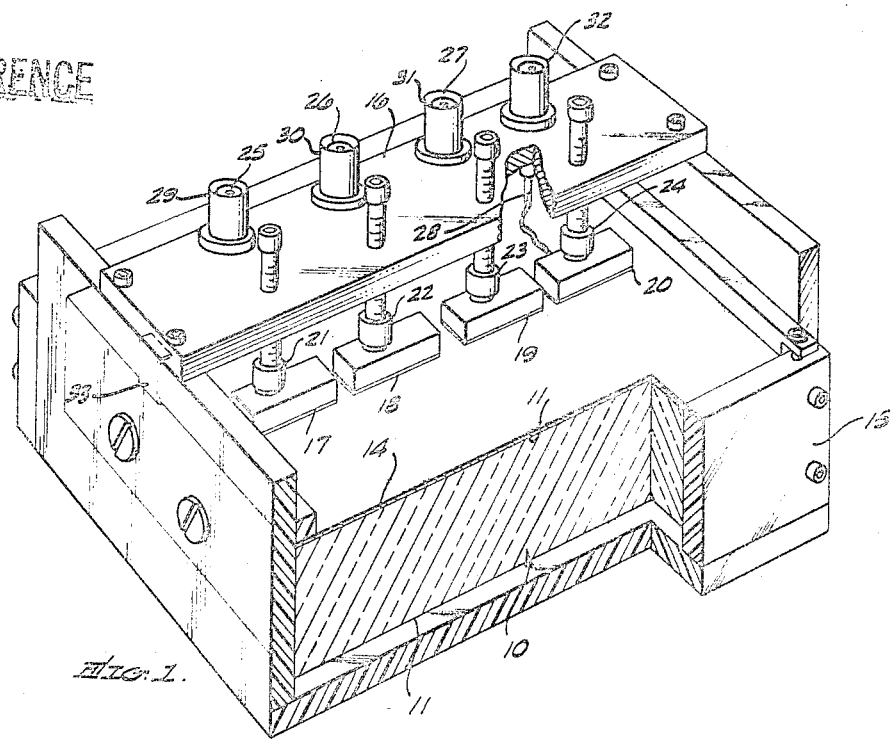
FIG. 1 shows a perspective view of a first embodiment of the present invention.

Referring now to FIG. 1 of the drawings, there is shown a first embodiment of the delay line of the present invention utilizing a scribed reflecting grating on a planar surface together with adjustable lapped transducers. In particular, the device of FIG. 1, shown in a cut-a-way view, includes a rectangular quartz block 10 having broad rectangular opposing surfaces 11, 12 and a conductive layer 14 such as, for example, gold film disposed over the entire surface 11. A lucite container 15 supports the quartz block 10 around the periphery thereof with no direct contact with the broad rectangular surfaces 11, 12 except at the edges. In addition, the container 15 is spanned by a longitudinal piece of metal 16 over the conductive layer 14.

PZT ceramic transducers 17, 18, 19 20 are pressed against the conductive layer 14 of block 10 utilizing adjusting screw mechanisms 21, 22, 23, 24, respectively. The PZT ceramic transducers 17, 18, 19, 20 are connected to the center conductors 25, 26, 27, 28 respectively, of coaxial connectors 29, 30, 31 32 which are disposed lengthwise along the longitudinal piece of metal 16 over the transducer 17, 18, 19 or 20 corresponding thereto and with the respective outer conductors thereof connected thereto. The longitudinal piece of metal is, in turn, connected to the conductive layer 14 by means of a metallic strip 33.

A scribed reflecting grating 35 is disposed normal to the longitudinal piece of metal 16 on the side 11 of rectangular quartz block 10 opposite the transducers 17, 18, 19, 20. The grating 35 is scribed at 80 lines per centimeter and a cut blazing angle of 60 degrees to provide maximum sensitivity at the 60 degree diffraction angle which corresponds to a frequency of 55 megacycles.

Figure 2:
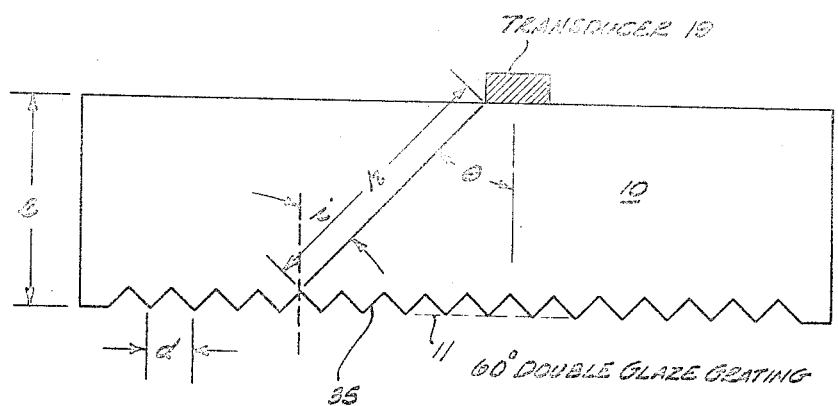
FIGS. 2 and 3 illustrate cross-sectional schematic diagrams of the device of FIG. 1.

Referring to FIG. 2 there is geometry for the single-ended operation configuration for the device of FIG. 1. The grating equation for the first order is:

$$d(\sin \theta + \sin i) = \lambda \qquad (1)$$

where $d$ is the distance between ruled lines, $\theta$ is the diffraction angle, $i$ is the incident angle, and $\lambda$ is the wavelength. The single-ended operation configuration is the simplest mode of operation and involves selecting one of the transducers 17, 18 19 or 20 opposite the grating 35. In this mode of operation, the output signals are taken from the same transducer to which the input signals are applied. Dispersed signals are generated when the input transducer aperture width is made equal to or less than a predetermined width, D. For a frequency of 25 megacycles/sec. and a transducer grating range, R, of 2.54 cm.

$$D \leq \sqrt{\frac{\lambda R}{2}} = 0.17 \text{ cm}.$$

The selected transducer 17, 18, 19 or 20 will receive the diffracted output wave for $i = \theta$ whereby the diffraction Equation 1 becomes:

$$2d \sin \theta = \lambda \qquad (2)$$

Since $\lambda = V_L/f$ where $V_L$ is the velocity of the longitudinal wave and $f$ is the frequency and $d=1/N$, where $N$ is the number of lines/cm. in the grating 35, Equation 2 can be written:

$$\sin \theta = \frac{NV_L}{2f} \quad (3)$$

From FIG. 2, the distance traveled by the ultrasonic wave is:

$$2r = \frac{2l}{\cos \theta} \quad (4)$$

From Equations 3 and 4, the time, $t$, for the longitudinal wave to travel the distance $2r$ is:

$$t = \frac{2l}{V_L \sqrt{1 - \left(\frac{NV_L}{2f}\right)^2}} \quad (5)$$

Figure 4:
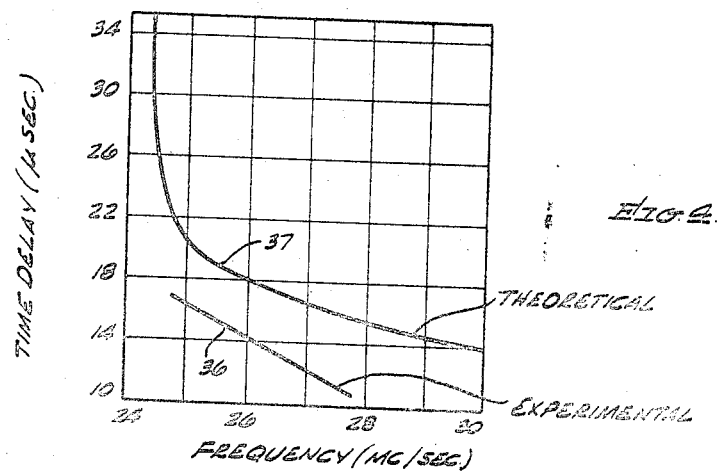
FIGS. 4 and 5 show performance characteristics of the device of FIG. 1.

The actual dispersion resulting from the single-ended mode of operation of the device of FIG. 1 is illustrated by the characteristic 36, FIG. 4, together with the theoretical dispersion calculated from Equation 5 illustrated by characteristic 37. It is evident that the theoretical values of time delay are greater than the actual values shown by characteristic 36. Also, the theoretical characteristic 37 is nonlinear while the actual characteristic 36 is more nearly linear. The cutoff value of the theoretical characteristic 36, however, does define the range in which actual values of delay are observed.

Figure 3:
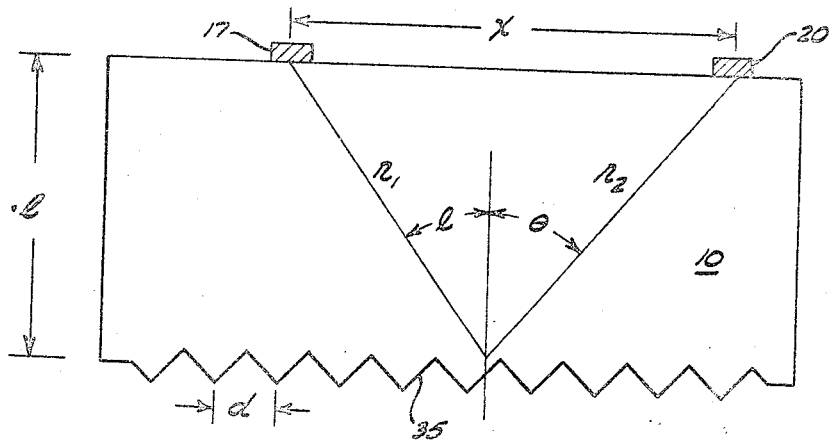

Referring to FIG. 3 there is illustrated "double-ended" operation of the device of FIG. 1 whereby two of the transducers 17, 18, 19 and 20 intercept the diffracted beam. In particular, an election is made to launch a beam from transducer 17 and intercept the diffracted beam with transducer 20. The distance separating transducers 17 and 20 is $X$, the angle of incidence of the beam on the grating 35 is $i$ and the angle of diffraction of the diffracted beam is $\theta$. With $N$, $V_L$ and $f$ as before, the equation for double-ended operation is:

$$\sin i + \sin \theta = \frac{NV_L}{f} \quad (6)$$

$$\sin i = \sqrt{1 - \frac{l^2}{r_1^2}} \quad (7)$$

where $r_1$ is the distance from the transducer 17 to the point of incidence on the grating 35:

$$\sin \theta = \sqrt{1 - \frac{l^2}{r_2^2}} \quad (8)$$

where $r_2$ is the distance from the transducer 20 to the point of diffraction from the grating 35.

Also, $$X = r_1 \sin i + r_2 \sin \theta \quad (9)$$

It is evident from Equations 6, 7, 8 and 9 that the parameters are completely specified whereby the delay time, $t_d$, between an input and output pulse is uniquely determined by:

$$t_d = \frac{r_1 + r_2}{V_L} \quad (10)$$

Figure 5:
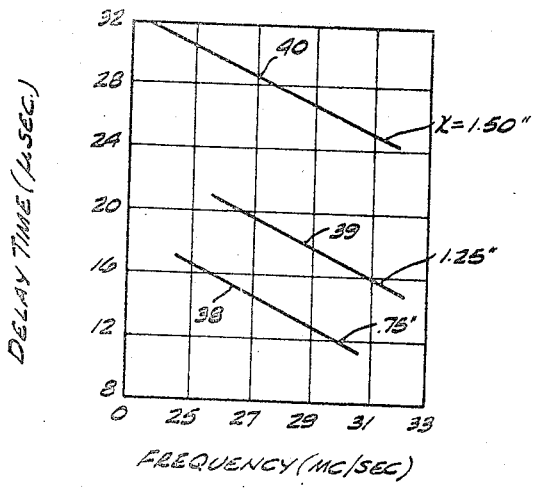

Referring to FIG. 5, characteristics 38, 39, 40 show the delay for different frequencies for separations, $X$, of 0.75", 1.25" and 1.50", respectively.

In fabricating the device of FIG. 1, it is apparent that the transmitting and intercepting transducers need not both be placed on a common side of the block 10. In fact, it can be shown that increased linearity can be achieved by placing the transmitting and intercepting transducers 17, 18, 19 or 20 on adjacent perpendicular sides with the grating 35 disposed opposite the transmitting transducer 17, 18, 19 or 20.

Figure 6:
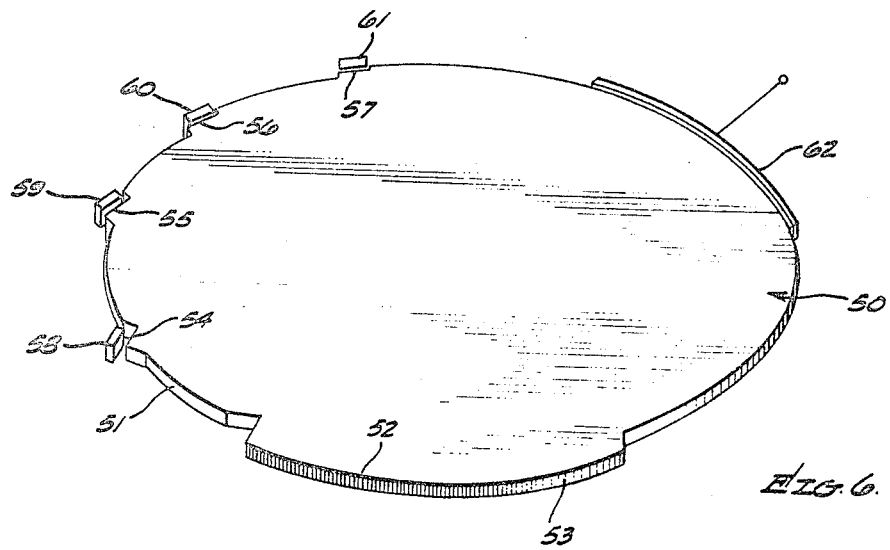
FIG. 6 shows a perspective view of a second embodiment of the invention incorporating a grating scribed on a Rowland circle.

Referring to FIG. 6, there is shown a schematic representation of an ultrasonic delay line 50 adapted to increase the frequency range of operation by utilizing lenseless focusing. In particular, the delay line 50 includes a slab 51 of uniformly thick metal or other medium capable of propagating ultrasonic waves and generally having a circular configuration. Approximately one/sixth the circumference of the circular slab 51 is extended to the configuration of a Rowland circle hereinafter designated the Rowland circle portion 52 of slab 51. The Rowland circle portion 52 defines an arc of a radius equal to the diameter of slab 51 and centered on the opposite circumference thereof. A grating 53 is scribed transversely across the entire length of the Rowland circle portion 52. In addition, indentations 54, 55, 56, 57 having normals directed towards the center of Rowland circle portion 52 are disposed at uniform intervals around the slab 51, respectively, for somewhat less than half the circumference thereof commencing with the portion 52.

Transmitting transducers 58, 59, 60, 61 are disposed adjacent the indentations 54, 55, 56, 57, respectively. Lastly, a receiving transducer 62 is disposed along the circumference of slab 51 for a distance substantially the same as the portion 52 and centered within a quadrant of slab 51 opposite the indentation 54. As before, the transducers 58, 59, 60, 61, 62 may be of the PZT ceramic type.

Figure 7:
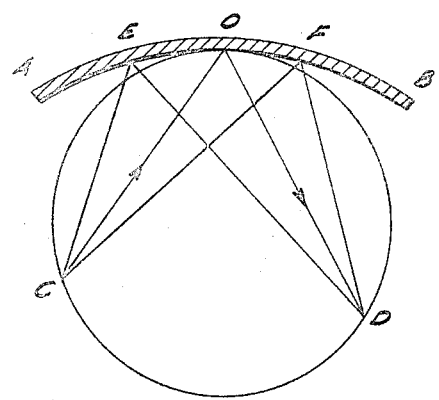
FIGS. 7 and 8 show schematic diagrams which illustrate the operation of the device of FIG. 6.
Figure 8:
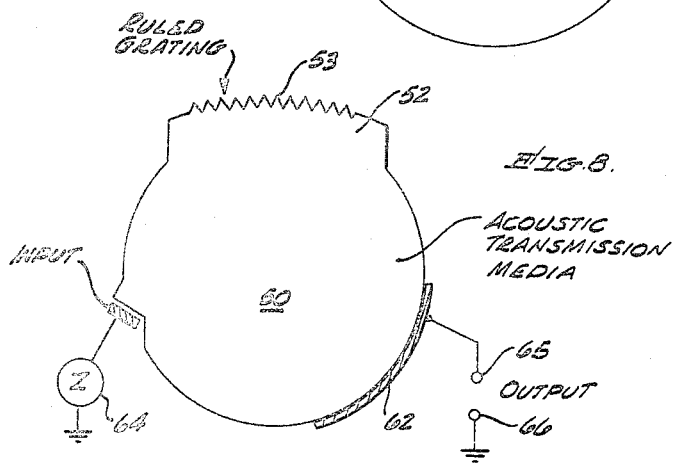

Referring to FIG. 7, a Rowland concave grating is shown as are AOB, i.e., an arc of a circle on which a linear transverse grating has been ruled. A smaller circle with a radius of half the radius of arc AOB represents the locus of converging points. Thus, as shown in FIG. 7, an input aperture at C will be diffracted in phase across the curved surface at E, O, or F and be focused at the point D. FIG. 8 illustrates the acoustic equivalent of FIG. 7. Referring to FIG. 8, a generator 64 provides a signal input to transducer 58, 59, 60 or 61 whereby an ultrasonic wave is launched towards the ruled grating 53 within the acoustic transmission media of slab 51. The diffracted wave is intercepted by the transducer 62 over a wide range of frequencies thereby to provide a delayed signal at output terminals 65, 66.

What is claimed is:

1. An ultrasonic delay line comprising means for providing a medium through which ultrasonic waves may be propagated, said medium having first and remaining spaced surfaces, said first surface having the configuration of a Rowland circle; a grating disposed on said first surface of said medium, the lines of said grating being normal being normal to the curvature of said surface; a first transducer disposed on one of said remaining spaced surfaces of said medium for launching an ultrasonic wave corresponding to an electrical impulse through said medium toward said grating; and a second transducer of a length substantially longer than said first transducer disposed on another of said remaining surfaces and having a radius of curvature one-half that of said Rowland circle, said second transducer being disposed in a position to intercept waves reflected from said grating thereby to delay said electrical impulse by an amount proportional to the distance traveled by said wave through said medium.

2. An ultrasonic delay line comprising means for providing a medium through which ultrasonic waves may be propagated, said medium having a first and remaining spaced surfaces; a single uniform reflecting grating disposed on said first surface of said medium, any cross section of said first surface of said medium taken normal to the lines of said single uniform grating having the configuration of a Rowland circle; a first transducer disposed on one of said remaining spaced surfaces of said medium for launching an ultrasonic wave corresponding to an electrical impulse; and a second transducer disposed on said one of said remaining spaced surfaces of said medium and spaced from said first transducer for intercepting said wave reflected normally from the lines of said single uniform reflecting grating thereby to delay said electrical impulse by an amount proportional to the distance traveled by said wave through said medium.

References Cited

UNITED STATES PATENTS

| | | | |
|---|---|---|---|
| 3,070,761 | 12/1962 | Rankin | 333—30 |
| 3,378,793 | 4/1968 | Mortley | 333—30 |
| 2,455,389 | 12/1948 | Soller | 333—30 |
| 2,408,436 | 10/1946 | Mason | 333—30 |
| 3,300,739 | 1/1967 | Mortley | 333—30 |
| 3,283,264 | 11/1966 | Papadakis | 333—6 |
| 3,304,520 | 2/1967 | Auld | 333—7 |

HERMAN K. SAALBACH, Primary Examiner

C. BARAFF, Assistant Examiner

U.S. Cl. X.R.

333—72; 310—9.5